UNITED STATES PATENT OFFICE.

LUDWIG SCHIECKE, OF MAGDEBURG, GERMANY, ASSIGNOR TO THEODOR WALLFISCH, OF SAME PLACE, AND GUSTAV BEHR, OF COLOGNE, GERMANY.

PROCESS OF HARDENING STEEL.

SPECIFICATION forming part of Letters Patent No. 648,058, dated April 24, 1900.

Application filed June 11, 1898. Serial No. 683,229. (No specimens.)

*To all whom it may concern:*

Be it known that I, LUDWIG SCHIECKE, a subject of the King of Prussia, German Emperor, and a resident of No. 14 Bahnhofstrasse, Magdeburg, in the Kingdom of Prussia, German Empire, have invented a new and useful Method of Hardening Steel, of which the following is an exact specification.

According to the present invention the piece or part of steel to be hardened is first coated with a protecting mass that is able to resist the heat of the fire in which the steel is heated, and thereafter cyanid of potassium is strewn upon that coating, whereupon the whole is put into the fire. The piece or part thus treated is then quenched. The object of the coating is to render the effect of the cyanid of potassium as uniform as possible, and I prefer to continue the application of the last-named substance after the steel, with its coating, is exposed to the fire; but instead of using only cyanid of potassium I use a mixture of this substance with coarse salt. By treating the steel in this manner I obtain in the same a very uniform structure which is not in the least changed when the steel is cooled down. This feature is particularly important in the case of machine parts and the like.

The coating consists generally of purified chalk and varnish; but the chalk may well be replaced by clay, oxid of zinc, and other substances that do not burn down in the fire. The oxid of zinc may be mixed with file-shavings of lead, when a solid crust will be obtained, resulting from the melting of the lead.

When the steel to be hardened, after having been coated with the protecting mass, is heated, together with this mass, the varnish, that merely forms a kind of a cementing medium, burns and a hard porous cover remains. During the further heating of the steel with this hard porous cover the cyanid of potassium strewn upon that cover passes into and through the pores of the latter and distributes its action uniformly upon the surface of the steel, because the pores are uniformly distributed over and through the said hard cover formed by or resulting from the protecting mass.

When using a mixture of cyanid of potassium and coarse salt, both substances are employed in pretty equal quantities, and the quantity of the whole mixture is of course dependent upon the size of the pieces or parts of steel to be hardened or of the extension of the surfaces of same, respectively.

I do not lay a claim to the protecting mass as such, as I am well aware that steel parts to be hardened have already been coated with compositions of a similar nature; but

What I claim, and desire to secure by Letters Patent of the United States, is—

1. The method of hardening steel, consisting in coating the steel with a mass adapted to protect it against direct contact with the fire, strewing cyanid of potassium upon that coating, heating the whole, and quenching it after the heating, for the purpose as described.

2. The method of hardening steel, consisting in coating the steel with a mass adapted to protect it against direct contact with the fire, strewing cyanid of potassium upon that coating, heating the whole, strewing a mixture of cyanid of potassium and coarse salt upon the coating during the heating, and quenching the whole after the heating, for the purpose as described.

In witness whereof I have hereunto signed my name, this 28th day of May, 1898, in the presence of two subscribing witnesses.

LUDWIG SCHIECKE.

Witnesses:
HENRY HASPER,
C. H. DAY.